United States Patent [19]
Backman et al.

[11] Patent Number: 5,340,880
[45] Date of Patent: Aug. 23, 1994

[54] POST-CHLORINATED SUSPENSION-POLYMERIZED POLY(VINYL CHLORIDE) HAVING AT LEAST 70 PERCENT CHLORINE

[75] Inventors: Arthur L. Backman, Westlake; Bernard F. Cinadr, Brecksville, both of Ohio

[73] Assignee: The B.F. Goodrich Company, Akron, Ohio

[21] Appl. No.: 38,425

[22] Filed: Mar. 29, 1993

Related U.S. Application Data

[63] Continuation-in-part of Ser. No. 837,180, Feb. 18, 1992, Pat. No. 5,216,088.

[51] Int. Cl.$^5$ ................................................ C08F 8/22
[52] U.S. Cl. ................................. 525/331.6; 525/356
[58] Field of Search ................................. 525/331.6

[56] References Cited

U.S. PATENT DOCUMENTS

| | | | |
|---|---|---|---|
| 3,287,336 | 11/1966 | Taylor | 260/87.1 |
| 3,506,637 | 4/1970 | Makino et al. | 260/92.8 |
| 3,532,612 | 10/1970 | Weben et al. | 204/159.18 |
| 3,591,571 | 7/1971 | Steinbach-Van Gaver | 260/92.8 |
| 3,597,342 | 8/1971 | Vita et al. | 204/159.18 |
| 3,632,848 | 1/1972 | Young et al. | 260/92.8 |
| 4,039,732 | 8/1977 | Schoen et al. | 526/43 |
| 4,350,798 | 9/1982 | Parker | 525/331.6 |
| 4,386,189 | 5/1983 | Ackerman et al. | 525/358 |
| 4,412,898 | 11/1983 | Olson et al. | 204/159.18 |

FOREIGN PATENT DOCUMENTS

| | | |
|---|---|---|
| 801304C | 10/1948 | Fed. Rep. of Germany . |
| 1566538 | 3/1968 | France . |
| 7611542 | 4/1975 | France . |

OTHER PUBLICATIONS

Chemical Abstracts, vol. 104, No. 2, Jan. 1986, Columbus, Ohio, Abstract No. 6360(e) p. 13, column 2.
"Studies in Organic Peroxides. XXV. Preparation, Separation and Identification of Peroxides Derived from Methyl Ethyl Ketone and Hydrogen Peroxide" by Milas, N. et al.

*Primary Examiner*—Bernard Lipman
*Attorney, Agent, or Firm*—Helen A. Odar; Alfred D. Lobo

[57] ABSTRACT

A novel chlorinated poly(vinyl chloride) ("CPVC") resin is prepared by a two-step process which uses an organic peroxide catalyst rather than a source of actinic light. The novel two-step "photoless" process yields a CPVC ("two-step CPVC") which, even at 72% Cl, is easily fusible at 170° C. It is now possible to extrude and injection mold parts with exceptional heat distortion properties attributable to the higher Cl content of the resin. The key distinguishing characteristic over a CPVC made in the presence of a distinct liquid chlorine phase, which CPVC is the most closely comparable CPVC, is when lines are drawn connecting points for measured $T_g$s as a function of Cl content, for each type of CPVC. The slope of a line for two-step CPVC is about 15% less than the slope of a line for CPVC produced by a process in which excess chlorine is present as a distinct liquid phase. Further, the slope of the line for the two-step CPVC is about 40% greater than that of a line for CPVC produced in an aqueous photochlorination process. CPVC made by a solution polymerization process is identified by its characteristic bulk density, morphology and NMR spectra for mole %$CCl_2$, mole %$CHCl$ and mole %$CH_2$, each as a function of NMR %Cl.

13 Claims, 7 Drawing Sheets

POST-CHLORINATED SUSPENSION-POLYMERIZED POLY(VINYL CHLORIDE) HAVING AT LEAST 70 PERCENT CHLORINE

CROSS-REFERENCE TO RELATED APPLICATION

This application is a continuation-in-part application of Ser. No. 837,180 filed Feb. 18, 1992 now U.S. Pat. No. 5,216,088.

BACKGROUND OF THE INVENTION

Chlorinated poly(vinyl chloride) resin (hereafter "CPVC") has gained in popularity for use in extruded pipe, cable jacketing and structural components for buildings, mainly because of its stability. However, such popularity is tempered by the fact that commercially available CPVC having a chlorine (Cl) content above 69% by weight (% by wt, or "% Cl"), referred to as "high-chlorine-concentration" (hereafter "high-Cl-conc" for brevity) CPVC, is as uneconomical to produce as it is difficult to process. Such high-Cl-conc CPVC is not prepared commercially. If made at all, on special order, it is made by the chlorination of an aqueous suspension of microporous PVC macrogranules ("granules" for brevity) in the presence of UV (ultraviolet) light radiation (referred to as the "photochlorination", "photo-slurry" or "water-slurry" process) over a much longer period of time than that required to make "standard CPVC".

The term "high-Cl-conc" CPVC is generally used in the art to refer to any CPVC having a Cl concentration greater than about 67%, and the term will be used herein in this general sense, as well as in the more specific sense it is used to refer to special order (at this time) CPVC having a Cl conc of at least 70%.

In some processes the UV-light may be varied during the process (referred to as "light ramping"); and in others, the temperature may be ramped ("temperature ramping"). In each case, the result is a macrogranular, microporous CPVC product characterized by a high concentration ("conc") of Cl per unit of surface area ("Cl/unit area"), in chains near the surface of a macrogranule. It has now been found that such "high-Cl-conc" CPVC is difficult to extrude or mold because of the relatively poor fusion characteristics of a mass of such granules, each of which granules has a higher conc of Cl near the surface than near its center.

Stated differently, the fusion temperature of granules of the same size and Cl content, of CPVCs made by the photo-slurry process, and, a two-step process which does not use light ("photoless") but a peroxide catalyst, respectively, is higher for the former because the Cl/unit area of surface of the latter ("two-step" granules) is lower. All reference to "Cl content" herein refers to Cl chemically bound in the polymer chains of the resin. Because poor fusion is the "fingerprint" of non-uniform distribution, particularly exaggerated in a high-Cl-conc CPVC resin, granules of high-Cl-conc resin which are easily fused are deemed to have relatively uniform distribution of Cl in them, and are referred to as "being essentially uniformly chlorinated". To achieve such essentially uniform chlorination in a high-Cl-conc resin, one must overcome the "blocking effect" of the high-Cl-conc zone near the surface, which zone is produced by the water-slurry process.

Numerous processes, other than photochlorination, have been proposed, but the predominant commercial photo-slurry process is disclosed in U.S. Pat. No. 4,412,898 to Olson et al. Except for the liquid chlorination process as taught by Parker in U.S. Pat. No. 4,350,798, or, the solution chlorination process in which a solution of PVC in a solvent such as tetrachloroethane is photochlorinated, we are unaware of any process, other than the two-step process of the parent application, which (process) does not produce CPVC having a higher Cl conc near the surface, than near the center of a granule (referred to as "non-uniform" chlorination).

We know of no CPVC other than polymer "A" and two-step CPVC which has an overall concentration of Cl=72% by wt, yet is fusible, so as to provide a continuous phase at 170° 1 C.

Such high-Cl-conc resin having a Cl content of at least 70% by wt, has been produced by us in a 'photoless' two-step process. PVC homopolymer is chlorinated in an aqueous slurry, to yield a CPVC macrogranular product with a Cl content of at least 70% by wt, and a lower concentration of chlorine near the surface of a granule, than can be obtained with any commercial process. Most of all, such a CPVC resin is made without sacrificing product quality.

These conclusions, that the concentration of Cl in "two-step CPVC" is lower near the surface than the conc of Cl in any other commercially made CPVC (and CPVC made by the Olsen et al process in particular), are derived from the observation that granules of the former, having the same Cl concentration and size distribution, fuse to provide excellent parts at a lower temperature than those made with the latter, without losing any strength and with improved heat distortion properties relative to a waterslurry CPVC having the same chlorine content.

CPVC produced by a solution chlorination process ("solution CPVC" made by a process exemplified in Example 6 below), or, by a process described in U.S. Pat. No. 4,386,189 to Ackerman et al, (hereafter "the '189 process") are not commercial materials. Though the disclosure of the '189 patent is limited to CPVC having a maximum of 69% Cl (not a high-Cl-conc resin having 70–75% Cl) applicants nevertheless used the process to produce a CPVC having >70% Cl because they surmised that such a CPVC would be the most closely comparable to the two-step CPVC. For reasons given below, it is confirmed that this CPVC made by the '189 process, referred to herein as 'polymer "A"', or "Ackerman CPVC", is most closely comparable to two-step CPVC. These two CPVCs are therefore compared and distinguished in detail herebelow.

Polymer "A" made by Ackerman et al had a specific gravity (sp gr) of 1,575 indicating a Cl content (covalently bonded) of 67%. They avoided photochlorination and the use of a swelling agent, by using a high-pressure process in which they chlorinated PVC resin in aqueous 10–30% hydrochloric (HCl) acid in the presence of a sufficiently large excess of liquid chlorine to form a distinct liquid chlorine phase; and, they catalyzed the reaction with a solution of organic peroxy compounds. Additional details of their process are provided in an example hereafter, which example was duplicated from the '189 patent for the purpose of comparing that resin with one made by the instant two-step process. As will be seen from test data presented herewith, the '189 process produced the most closely comparable (with two-step CPVC) CPVC resin.

The significance of Ackerman et al carrying out the reaction in the presence of an excess of chlorine and a large amount of aqueous (say 10 −24% HCl) cannot be overlooked because the concentration of peroxide catalyst is typically very low in the range from $10^{-4}$ to $10^{-5}$ mole/liter, and is affected by the concentration of hypochlorous acid (HOCl) in the slurry being chlorinated. When the slurry contains 10.9% HCl (the formality of electrolyte is 3.987) the concentration of HOCl is $1.1 \times 10^{-6}$ mole/liter; when the slurry contains 18.8% HCl the concentration of HOCl is only $6.2 \times 10^{-7}$ mole/liter (see "The Solubility of Chlorine in Aqueous Solutions of Chlorides and Free Energy of Trichloride Ion" by M. S. Sherril and E. F. Izard, Research Laboratory of Physical Chemistry, Massachusetts Institute of Technology, *J. Am. Chem. Soc.*, Vol 53, pg 1667, May 1931).

Without the addition of HCl to the two-step system, we have less than 0.5% HCl, typically from 0.05 to 0.1 moles/liter of HCl (about 0.18% to 0.36% HCl) equivalent to 0.05 to 0.1 moles/liter of HOCl. This difference in HOCl conc between the '189 process and that used to make two-step CPVC, is much more than just 10 times (one order of magnitude); the difference is more than three orders of magnitude ($10^3$).

The novel CPVC is produced by a two-step process which has several advantages: (1) it does not require the use of added aqueous HCl; this obviates the necessity to recover, purify and recycle the HCl; (2) it does not require the use of a large excess of chlorine, which obviates the necessity to recover, purify and recycle the chlorine; and, (3) the reaction proceeds with a controlled rate of generation of heat which requires little, if any heat removal initially, then proceeds at elevated temperature in excess of 100° C. in the second step. These features make producing the two-step CPVC a commercial reality.

Further, not only is our high-Cl-conc CPVC product of excellent quality, but its Cl conc in the range from 70–75%, is distributed throughout the granules providing substantially uniform chlorination, with the result that the concentration of Cl near the surface is lower than it would be in any known, commercial aqueous chlorination process.

SUMMARY OF THE INVENTION

A high-Cl-conc CPVC product, whatever its Cl content in the range from 70–75%, is chlorinated intragranularly, with a sufficiently low Cl conc near its surface, so as to result in an easily fusible granular product having physical properties which are unexpectedly quite distinct from those of a CPVC product of like Cl content, but made by any known process, specifically one in which the reaction mass provides a distinct liquid chlorine phase to yield polymer "A", or CPVC made by a solution chlorination process (hereafter, "solution CPVC" for brevity), or any commercial, aqueous photochlorination process ("water-slurry CPVC").

This novel CPVC product is distinguishable from all known, comparably high-Cl-conc CPVCs by its physical properties. Specifically, two-step CPVC is distinguished from all, except polymer "A", by a comparison of: (1) the distinctive mole % $CCl_2$ measured in portion of curves in the range from 70–75% by wt NMR %Cl; (2) the distinctive mole %CHCl in the portions of curves in the range from 70%–75% by wt NMR Cl; (3) the distinctive mole % $CH_2$ in the portions of curves in the range from 70–75% by wt NMR Cl; and, (4) the distinctive bulk density of microporous granules as a function of their Cl content in the novel CPVC composition. Two-step CPVC is distinguished from polymer "A" by the distinctive slope of a line connecting its measured mid-point $T_g$s (glass transition temperatures) as a function of Cl content; and two-step CPVC, at 72% by wt Cl, is distinguished from water-slurry CPVC at 72% Cl by the former fusing into a substantially light-permeable homogeneous mass at 170° C., while the latter does not.

For reasons given below, a first known 'solution CPVC' is readily distinguishable from a second known 'water-slurry CPVC', as is a third 'two-step CPVC'. Since density and morphology uniquely distinguish 'solution CPVC', data for its $T_g$ at different Cl levels is not provided. Sufficient detailed data to support the conclusions derived from the comparisons made, are presented herein, but more detailed data are provided for the 'water-slurry CPVC' and polymer "A", because NMR analysis alone does not distinguish polymer "A" from two-step CPVC.

The novel high-Cl-conc two-step CPVC is the result of post-chlorinating a suspension polymerized PVC granular resin in a two-step process. In the first step, PVC homopolymer having a Cl content in the range from about 55% to about 58% is chlorinated in an aqueous suspension, commencing at a relatively low temperature below 75° C. and continuing up to about 100° C. and pressure from 1–5 atm, in the presence of from 0.5% but less than 10% stoichiometric excess of chlorine over that required to make the desired Cl content of the CPVC end-product, and a catalytic amount of a peroxyester, hydroperoxide or dialkyl peroxide catalyst having a 10 hr half-life in the range from 50° C.–120° C., in the substantial absence of oxygen, until the Cl content is in the range from 68–69% by wt. In the second step, the chlorination reaction is continued, maintaining an excess of Cl from 0.5% to 10% over stoichiometric, and a catalytic amount of a peroxyester, hydroperoxide or dialkyl peroxide which preferably has a 10 hr half-life in the range from about 100° C.–200° C., in the presence of from about 5 ppm but less than 100 ppm of molecular oxygen until the Cl content of the CPVC product is in the range from 70–75%. Despite its higher density (due to its higher Cl content) compared to that of suspension polymerized PVC from which the two-step CPVC is made, the general morphology of the CPVC granules after they are chlorinated, is not markedly different from that of the granules before their chlorination.

More particularly, a high-Cl-conc CPVC having from 71%–73% by wt Cl, is produced in a commercially viable two-step process in which solid microporous granules of PVC in an aqueous suspension, are chlorinated in a two-step process. In the first step, PVC is converted in the presence of an organic peroxy catalyst, to 'first step CPVC' having a sufficiently high Cl content to enable the 'first step CPVC' to be further chlorinated in a second step in the presence of oxygen, and, optionally additional organic peroxy catalyst, to gain at least 3% Cl content within about 30 min at a controllable temperature lower than the $T_g$ of the CPVC formed, substantially independent of the volume of slurry in the reactor while the second step is being carried out.

The higher the desired Cl content of the CPVC end product, the longer the overall time of the chlorination reaction. A Cl content of about 75% in the end product may be obtained, starting with 57% Cl PVC, within about 3 hr, the time being measured from the time in the first step, when the aqueous reaction mass charged with chlorine is warm enough to react sufficiently to decrease the relative pressure in the reactor (referred to as the "relative pressure curve rolling over").

It is therefore a general object of this invention to provide a mass of CPVC granules having a Cl content in the range from 70% to 75%, which CPVC is fusible at a lower temperature than CPVC granules having the same Cl content but made by an aqueous photo-slurry (photochlorination) process, and which is conventionally blendable with minor quantities of impact modifier, processing stabilizers, antioxidants, fillers and pigments, for extrudable, injection moldable, and otherwise thermoformable blends.

It is another specific object of this invention to provide a mass of CPVC having 70–73% Cl by wt, from the foregoing two-step process comprising, using in the first step, an organic hydroperoxide derived by reacting an aliphatic ketone, preferably a $C_1$–$C_5$ (lower alkyl) ketone, with hydrogen peroxide.

It is also a specific object of this invention to provide a high-Cl-conc CPVC containing a designated amount of Cl in the range from 70–75%, as the product of a two-step process, comprising, in a first step, (a) confining the aqueous suspension of PVC in a pressurizable reaction zone maintained at a temperature in the range from 20° C. to about 50° C., wherein the PVC is mixed with no more than a 10% excess of molecular chlorine over that required to form the desired CPVC end product, but insufficient to provide a distinct liquid chlorine phase, so as to form an acidic suspension of the PVC in the absence of added aqueous hydrochloric acid;

(b) adding an effective amount of an organic peroxy catalyst selected from the group consisting of peroxy carboxylic acid esters, diorganoperoxycarbonates, diacyl peroxides and mixed anhydrides of organic sulfoperacids with carboxylic acids, preferably a catalyst which has a decomposition temperature lower than 80° C., most preferably a hydroperoxide derived from a lower alkyl ketone and hydroperoxide, in an amount sufficient to initiate chlorination of the PVC, preferably from 0.005–0.5% by wt, while maintaining temperature of the suspension below 100° C. for a period sufficient to provide a first step CPVC product having from 67–70% by wt Cl chemically bound in a second step, (c) introducing a catalytic amount of oxygen-containing gas, optionally generated in situ, also in the absence of added aqueous hydrochloric acid, and optionally with additional said peroxy catalyst and/or molecular chlorine in an amount insufficient to provide a distinct liquid chlorine phase; and (d) raising the temperature from below 100° C. to a temperature no higher than 130° C. for a time sufficient to allow additional chlorine to react with the CPVC from the first step, until the relative pressure of Cl is less than 0.1 when the designated level of Cl in the polymer is attained, which level is at least 3% higher than that of the first step CPVC, yet without exceeding the glass transition temperature of the CPVC end product formed.

BRIEF DESCRIPTION OF THE DRAWING

The foregoing and additional objects and advantages of the invention will best be understood by reference to the following detailed description, accompanied with graphical illustrations of preferred tests for distinguishing between various CPVC samples made by different processes.

DETAILED DESCRIPTION OF PREFERRED EMBODIMENTS

The novel high-Cl-conc two-step CPVC has a sufficiently low concentration of Cl near its surface to be readily fusible at a temperature of 162° C. though the fused product is not clear. Such fusion occurs despite two-step CPVC having a higher $T_g$ than another differently produced microporous, macrogranular, CPVC having essentially the same specific gravity and a like Cl content, because two-step CPVC has a lower fusion temperature.

As will presently be more readily evident, there is no easy way to identify, unequivocally, a sample of two-step CPVC. When resins are compared, each having essentially the same Cl content, but made by different processes, to identify the two-step sample, NMR analysis narrows down the samples to two: polymer "A" (from the '189 process) and two-step CPVC. This narrowing down of the choices occurs because the water-slurry CPVC and the solution CPVC are unequivocally identified by the NMR analysis. Thereafter, choosing which of the remaining two samples is the two-step CPVC and which is Ackerman's (polymer A) is done by a comparison of the slopes of their $T_g$s measured at different Cl contents.

Because $T_g$ analyses is the best method now known to distinguish between and identify the two-step CPVC and polymer "A" samples, these tests will be described first. To ensure the validity of comparing the slopes of Tg curves for the two-step resin and polymer "A", samples of each were "cleaned" and remeasured, as described below.

Figure 1:
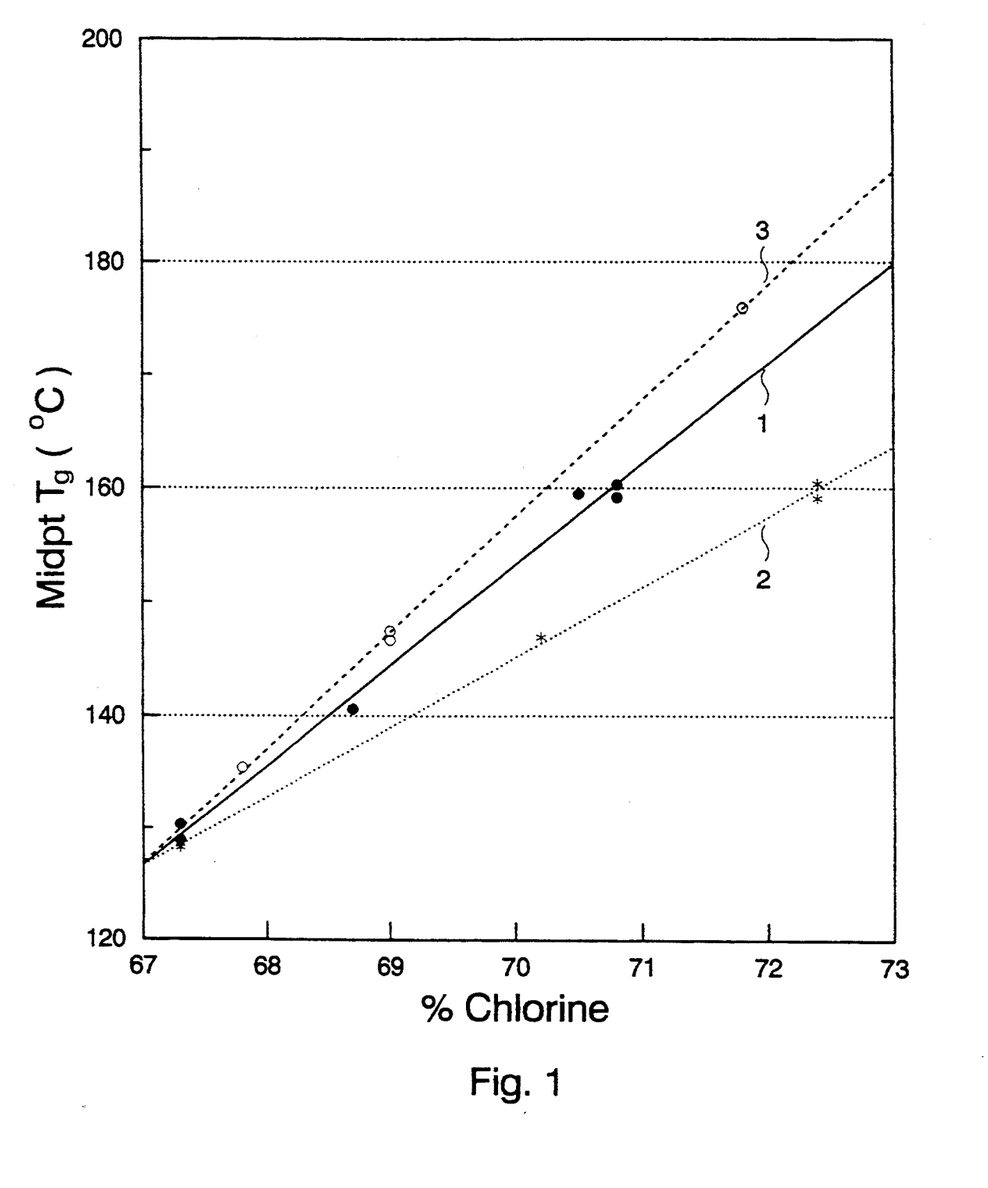
FIG. 1 graphically presents lines having different slopes, for samples of high-Cl-conc CPVC produced by '189 process (polymer "A"), the "water-slurry" process ("water-slurry" CPVC), and the two-step process ("two-step CPVC"), each line connecting points for each CPVC which points represent a measured midpoint $T_g$ (in °C) as a function of the % Cl by weight in each sample. All lines are drawn using the best least squares fit as provided by a computer program designated Lotus Freelance Plus 3.01.
Figure 2:
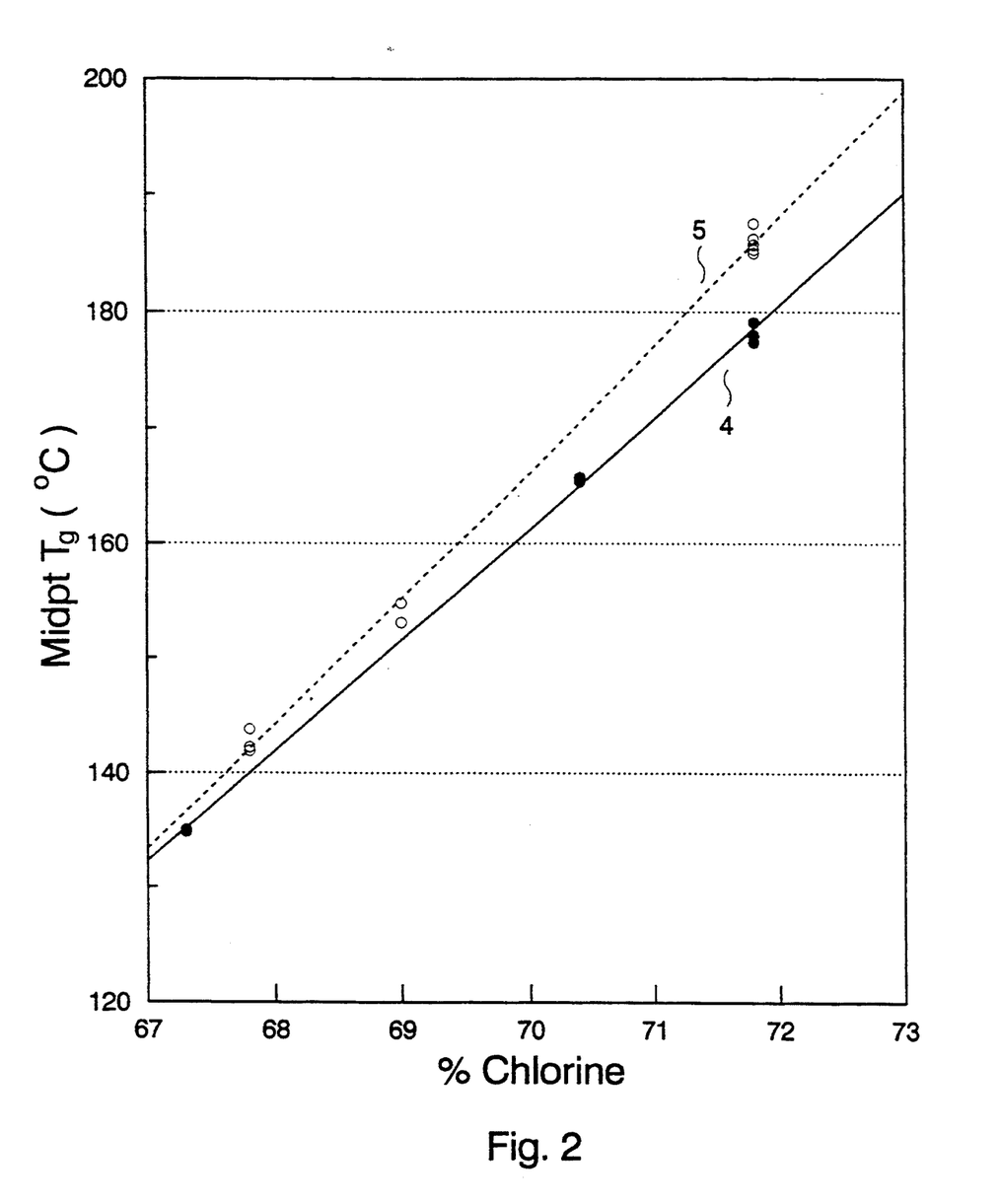
FIG. 2 graphically presents a comparison, of cleaned samples of high-Cl-conc CPVC produced by each, the '189 and the two-step processes. Each line connects points which represent a measured midpoint $T_g$ (in °C.) as a function of the % Cl by weight in each sample. The line for the '189 process is seen to have a steeper slope.
Figure 3:
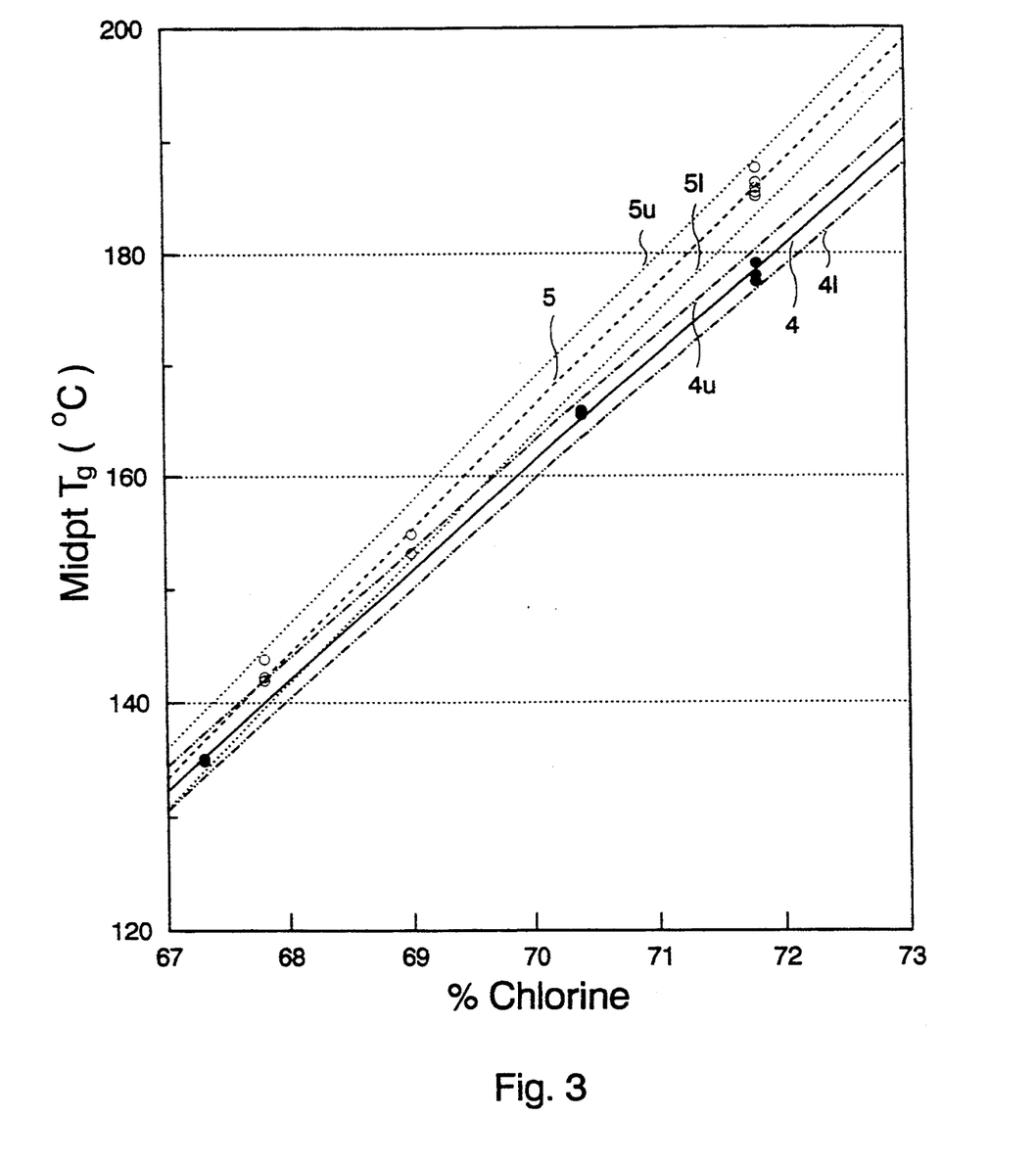
FIG. 3 graphically presents the same comparison of the "cleaned" resin, showing the limits for a confidence level of 90% for the measurements made.

Referring to FIGS. 1–3, there are shown plots of the measured midpoint $T_g$ (written as "midpt $T_g$ (° C.)" in the Figs) as determined with a Mettler DSC-30 Differential Scanning Thermometer, as a function of % Cl by wt in each CPVC sample. The instrument was calibrated to ±0.5° C. with indium and zinc as standards.

The measurements were made using the following procedure: A sample (from 10 mg to 50 mg) was placed in an aluminum pan which was covered with an aluminum lid, and crimped closed. The closed pan was placed in the DSC instrument which was purged with nitrogen, and the pan cooled to −30° C. with liquid nitrogen. All samples were free of stabilizer or any other additives other than those which may be present as a result of the process by which the sample was produced.

The sample was heated to 230° C. at a constant 20° C./min and upon reaching the temperature, the sample was cooled until it reached −30° C., again at constant 20° C./min. The sample was not held at 230° C. because the unstabilized CPVC would decompose. The controlled matching cooling rate which mirrors the heating rate, places the $T_g$ in equilibrium. This procedure is designed to nullify the effect of the previous thermal history, if any, of the resin.

Each sample was again heated to 230° C. (second heat), then quench-cooled to room temperature (20° C.) with liquid $N_2$. All $T_g$ measurements were made on the second heat, and values used are the midpoints of the transitions using the initial and final base lines for the main transition because no shoulder of significance was observed.

Referring to FIG. 1, the solid line indicated by reference numerals 1, dotted line 2 and dashed line 3 are plots of points which represent a measured midpoint $T_g$ (in ° C.) as a function of the % Cl by weight in each sample of CPVC, "as made" by the two-step process, the water-slurry process, and the '189 process, respectively. By "as made" is meant that the samples are used as recovered from the process without any further processing.

In each process, the starting material was the same suspension polymerized PVC having granules in the same size range from 100° μm–180° μm. In each, the '189 and the two-step processes, the peroxide catalyst was diluted with 1.3% by wt (based on the PVC charged), of DO-10 diluent, low viscosity chlorinated olefin oil (from Dover Chemicals). This diluent depresses the Tg without substantially affecting the slope of the line of midpt Tg vs. weight % Cl. For two-step CPVC at 71% Cl, a $T_g$ of 162° C. is measured; for polymer "A" at 71% Cl, a Tg of 168° C. is measured. For two-step CPVC at 73% Cl, a Tg of 180° C. is measured; for polymer "A" at 73% Cl, a Tg of 188° C. is measured. A difference of at least 5° C. is seen in the range from 70%–73% by wt Cl, the slope of polymer "A" being greater than that for two-step CPVC. This measured difference between the $T_g$s of two-step and polymer "A", each at the same wt % Cl, provides evidence that the $T_g$ of the two-step CPVC is always lower at any given wt % Cl in the range from 70–73%. This property is therefore deemed a characterizing difference between two-step CPVC and polymer "A". This property is particularly desirable because the lower $T_g$ at any specific Cl concentration in the specified range of 70–73%, confers processability of the polymer at a lower temperature than would otherwise be possible.

It is evident that each of the lines has a different slope, the slope for polymer "A" being the steepest. It is also evident that as the Cl content of the samples approached 67%, there were no differences.

Measurements of the slopes indicate that the slope of the line 1 (for the two-step CPVC) is 12% ±3%, that is, about 15% less than the slope of a line 3 for polymer "A" produced in the presence of a distinct liquid chlorine phase; and 33% ±5%, that is, about 35% greater than the slope of a line 2 for CPVC produced in an aqueous photo-chlorination ("water-slurry" or "photo-slurry") process.

The equation defining the line 1 for two-step CPVC is:

$$T_g = 8.86 \, (\%Cl) - 467.01$$

The equation defining the line 2 for water-slurry CPVC is:

$$T_g = 6.16 \, (\%Cl) - 286.39$$

The equation defining the line 3 for polymer "A" is:

$$T_g = 10.21 \, (\%Cl) - 557.39$$

Each line, and the equation which represents that line, uniquely defines the properties of each type of CPVC as evidenced by their $T_g$ s.

Referring to FIG. 2, there is shown a comparison of samples of the two-step CPVC and polymer "A", respectively, represented by lines referenced by numerals 4 and 5, after the samples were "cleaned". This was done to set aside the possibility that the differences in slope might be due to "impurities" in one or the other of the resins, or both. Cleaning was done by dissolving each sample in 60 gm of THF, then precipitating the CPVC in about 550 ml of methanol. The precipitated, cleaned resins were then dried overnight at 70° C.

A comparison of the slopes of the lines 4 and 5 indicates that line 5 for the cleaned polymer "A" has a steeper slope, but unlike in FIG. 1, for any Cl content >67%, the value on the y-axis is always greater; that is, an intercept on a moving y-axis is always higher for line 5, at any Cl concentration, the difference in the intercept being greater as the Cl conc increases. This is confirmation that the novel resin has a lower $T_g$ than the polymer "A" at any Cl conc above 68%, and the difference is progressively greater as the Cl conc exceeds 70%.

Measurements of the slopes indicate that the slope of the line for the cleaned two-step CPVC is still about 12% ±3% less than that of a CPVC produced in the presence of a distinct liquid chlorine phase (Ackerman's '189 process).

Referring now to FIG. 3, there is shown the limits for a confidence level of 90% for the measurements made in the comparison of "cleaned" resins illustrated in FIG. 2. Lower line 4l and upper line 4u are the calculated lower and upper 90% confidence limits, respectively for line 4 (using RS/Series software). Similarly, lower line 5l and upper line 5u are the calculated lower and upper 90% confidence limits, respectively for line 5, lines 4 and 5 representing the plots for the two-step resin and polymer "A" respectively.

Figure 4:
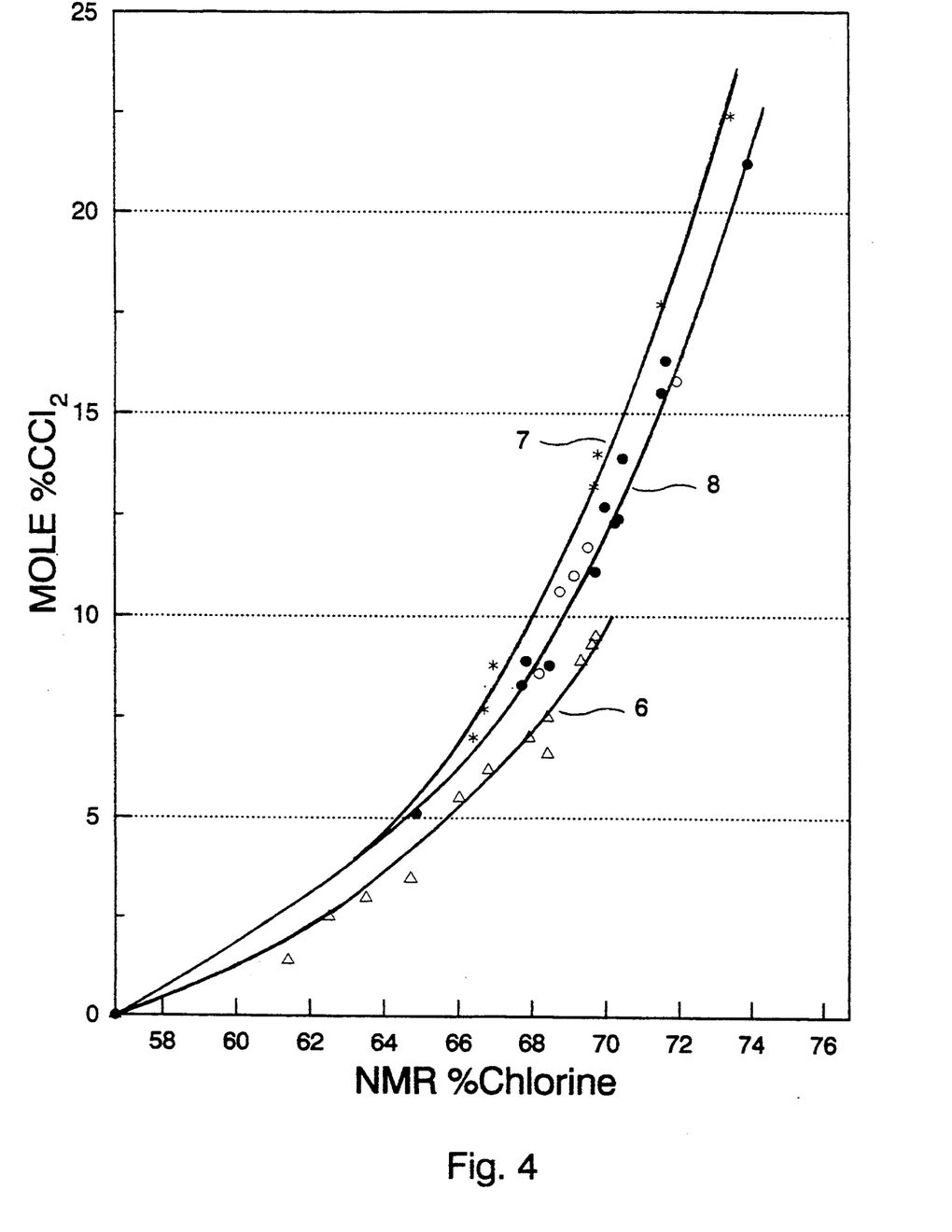
FIG. 4 graphically presents, for samples of CPVC containing as little as 61% NMR % Cl, produced by a solution chlorination process, the "water-slurry" process, the '189 process, and the two-step process, a summary of $C^{13}$NMR (nuclear magnetic resonance) spectra in which the NMR % Cl is plotted against the mole % $CCl_2$ in each sample.

Referring now to FIG. 4 there is shown a plot of a summary of $C^{13}$ NMR spectra in which the NMR % Cl is plotted against the mole % $CCl_2$ in numerous samples produced by each of the four different processes. Measurements made as described hereinabove on samples of solution CPVC, water-slurry CPVC, polymer "A", and two-step CPVC, yield curves 6, 7 and 8 respectively. A single curve 8 is fitted through the points for the two-step and Ackerman CPVCs, indicating that for these two processes, at the same NMR %Cl, there is no readily discernible distinction with respect to relative displacement between the curves for the two-step CPVC and polymer "A". However, at the same NMR %Cl, the number of Cl-disubstituted C atoms in two-step CPVC is clearly greater than that present in solution chlorinated CPVC, and smaller than that present in photochlorinated CPVC. The large differences between the mol %$CCl_2$ for solution and water-slurry CPVCs clearly identifies each.

FIG. 4 provides graphical evidence that as the Cl content diminishes, such differences in the shapes and slopes of the curves as might exist as higher Cl levels, are minimized. As the Cl content increases in CPVC, particularly in the range from 70–75% Cl, the molt % $CCl_2$, percentage of Cl-disubstituted carbon ("C") atoms, increases, as would be expected; but the number of such Cl-disubstituted C atoms (measured as mol % $CCl_2$) for different samples of high-Cl-content CPVC, generally differs depending upon how each sample was made. In the particular case of polymer "A" and the two-step CPVC, that number does not differ significantly, and for any given NMR %Cl, the mol %$CCl_2$ lies intermediate values for the mol % $CCl_2$ for solution and water-slurry CPVCs. Stated differently, curves fitted through the points for each CPVC sample show that, at the same NMR %Cl, the mol %$CCl_2$ for solution CPVC is smaller than that for water-slurry CPVC; however, there is no readily discernible distinction relative to the mol % $CCl_2$ present in the two-step CPVC and polymer "A". As seen, the values for the mol %$CCl_2$ for samples of two-step CPVC and polymer "A" substantially overlap as plotted in line 8 which lies intermediate lines 6 and 7 for values measured for solution CPVC and water-slurry CPVC.

Figure 5:
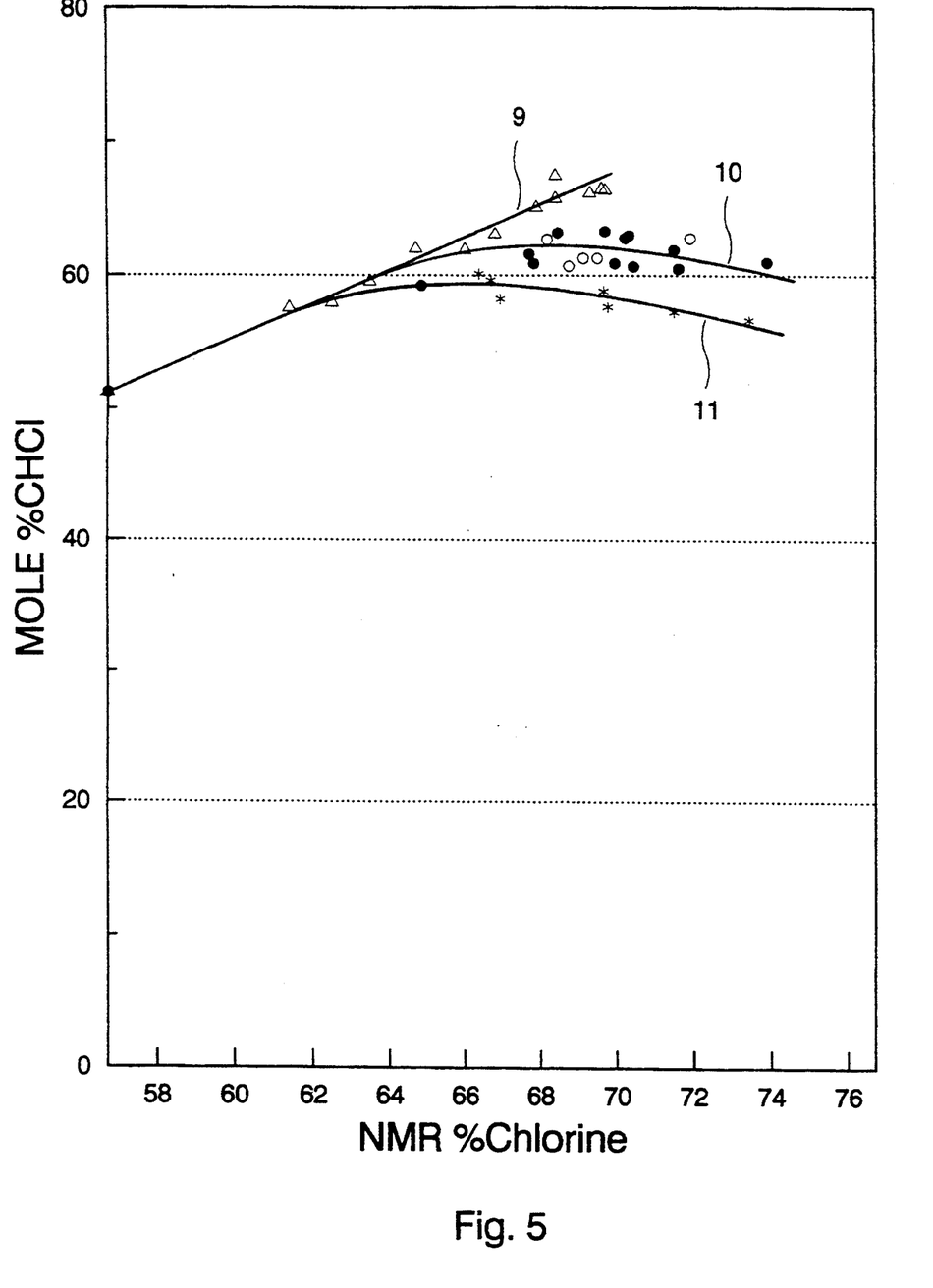
FIG. 5 graphically presents, for the same samples of CPVC produced for the comparison illustrated in FIG. 4, a summary of $C^{13}$ NMR spectra in which the NMR % Cl is plotted against the mole % CHCl in each sample.

Referring now to FIG. 5 there is shown a plot of a summary of $C^{13}$ NMR spectra in which the NMR % Cl is plotted against the mol % CHCl (monochloro-substituted C atoms) in samples of solution CPVC, polymer "A", two-step CPVC, and the "water-slurry" CPVC, to yield curves 9, 10 and 11 respectively. At the same NMR % Cl, points on line 11 show the mol %CHCl in the water-slurry CPVC are clearly lower than points on the line 9 for solution CPVC; and, the curve 10 for two-step CPVC lies intermediate the lines 9 and 11. A single curve 10 is fitted through the points for the two-step CPVC and polymer "A", because for these two samples, at the same %Cl, there is no readily discernible distinction with respect to relative displacement between the curves. Stated differently, curves fitted through the points for each CPVC sample show that, at the same NMR %Cl, the mole %CHCl for water-slurry CPVC is smaller than that for solution CPVC; curves fitted through the points for the two-step CPVC and polymer "A", show that, at the same NMR Cl, there is no readily discernible distinction relative to the number of mono-Cl-substituted C atoms; but at any NMR %Cl, the mole % of such atoms in the two-step CPVC and polymer "A" is clearly smaller than is present in the solution chlorinated CPVC, and greater than the number present in the water-slurry CPVC. At any NMR %Cl, values for mole CHCl in the two-step CPVC and polymer "A", overlap and lie intermediate values measured for solution and water-slurry CPVC.

Figure 6:
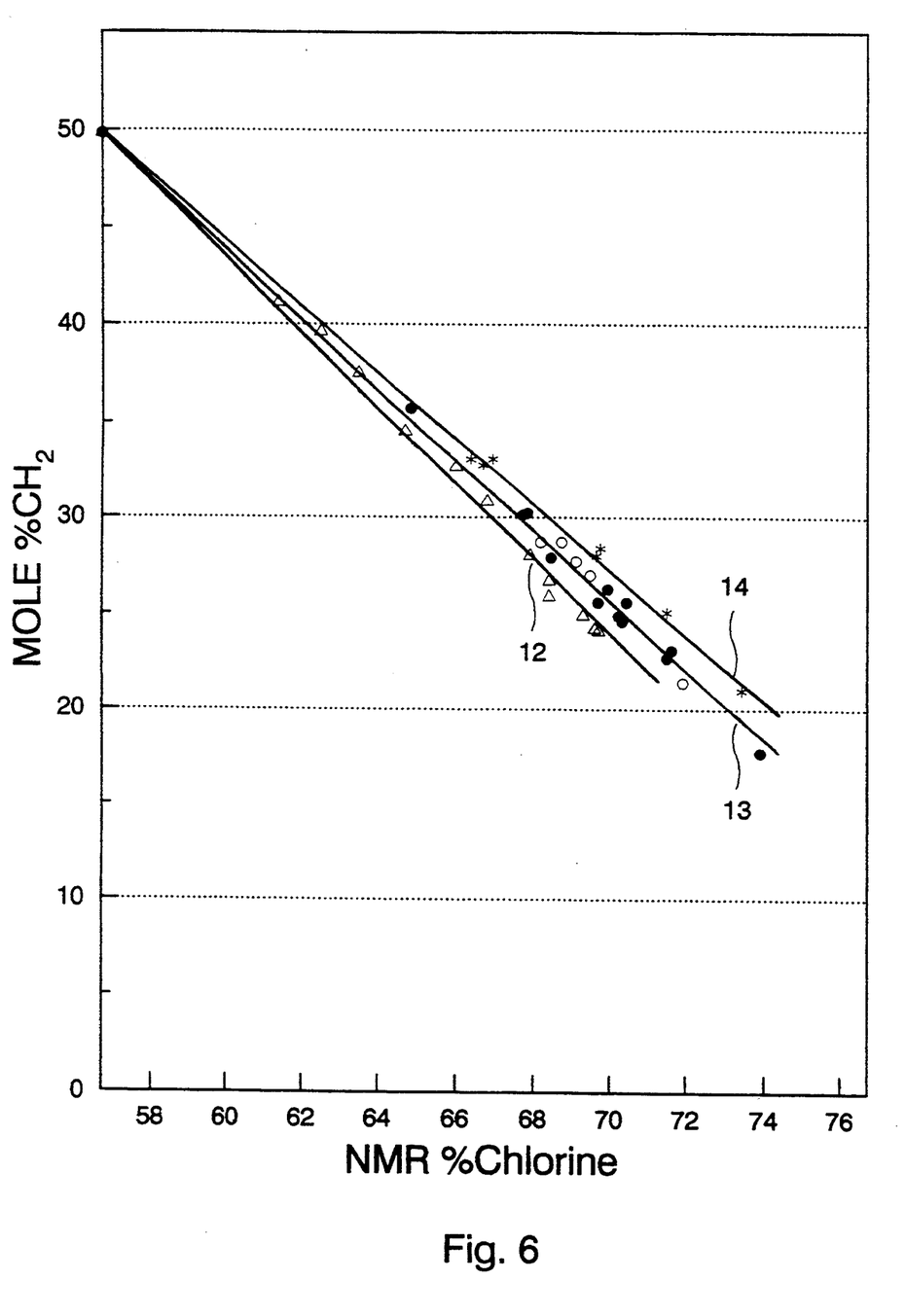
FIG. 6 graphically presents, for the same samples of CPVC produced for the comparison illustrated in FIGS. 4 and 5, a summary of $C^{13}$ NMR spectra in which the NMR % Cl is plotted against the mole % $CH_2$ in each sample.

Referring now to FIG. 6 there is shown a plot of a summary of $C^{13}$ NMR spectra in which the NMR % Cl is plotted against the mole %$CH_2$ (mole % unsubstituted C atoms) in samples produced by each of the aforementioned processes to yield curves 12, 13 and 14 respectively. At the same NMR %Cl, mole %$CH_2$ in the water-slurry CPVC is greater than the mole %$CH_2$ present in solution CPVC. However, a single curve 13 is fitted through the points for the two-step CPVC and polymer "A", because for these two CPVCs, there is no readily discernible distinction with respect to relative displacement between their curves. Stated differently, curves fitted through the points for the two-step CPVC and polymer "A" show that there is no readily discernible distinction relative to mole % $CH_2$ (unsubstituted C atoms). At any NMR %Cl, values for mole %$CH_2$ in the two-step CPVC and polymer "A" plotted in line 13, overlap and lie intermediate values measured for solution and water-slurry CPVC, and plotted in lines 12 and 14 respectively.

Referring now to apparent (bulk) density and particle size of samples produced by different processes, a solution chlorinated sample is quickly recognizable by its particle morphology. Solution chlorinated CPVC has distinctive and characteristic, fine particle size, as opposed to the large macrogranular particles of two-step CPVC and polymer "A". Solution chlorinated CPVC also has a much lower bulk density than either two-step CPVC or polymer "A". The latter two have similar morphology, and the particle size range of the CPVC in each sample is essentially the same as the particle size of the PVC from which the CPVC was obtained. Further, the bulk densities of two-step CPVC and polymer "A" are essentially the same. Thus a differentiation between these two samples cannot be made based on their morphology or bulk density.

The measured bulk density of each type of CPVC resin was measured with an ASTM D1895 60 method A with one exception—the resins were treated with methanol rather than carbon black, to negate electrostatic charge.

Briefly, the required amount of resin is weighed into a container, shaken for about 30 sec. with 1.0 gm of methanol, then poured into a funnel with its spout closed above a cup. The spout is then opened and the treated resin allowed to flow from the funnel into the cup. The surface of the resin is leveled with a straight edge across the rim of the cup, by removing that portion of resin which extends above the horizontal plane of the rim of the cup. Excess resin on the sides of the cup is brushed off. The bulk density or specific gravity of each sample is calculated by dividing the weight of treated resin in a full cup, by the volume of the full cup.

The average measured specific gravity of each of several samples, at each of different concentrations of Cl

| (wt % Cl) are listed as follows: | | |
| --- | --- | --- |
| Sample | wt % Cl | specific grav. |
| Water-slurry | 67.3 | 0.555 g/cc |
| Water-slurry | 70.5 | 0.571 |
| Two-step | 67.3 | 0.574 |
| Two-step | 70.6 | 0.581 |
| Two-step | 71.8 | 0.595 |
| Polymer A | 67.8 | 0.579 |
| Polymer A | 69.0 | 0.579 |
| Polymer A | 71.8 | 0.385 |
| Solution chlorinated polymer | 70.9 | 0.122 |

It is evident from the foregoing that there is no significant difference between the densities of the two-step CPVC and Polymer A.

It will now also be evident why the slopes of the lines for the two-step CPVC and polymer "A", presented in FIG. 1 is of such significance. Since the measurements of $T_g$ is a routine task which can be done repetitively, one can obtain reliable differences in $T_g$ for various samples.

Thus, given four samples in coded bottles, one for each type of CPVC, the powdery non-granular form and bulk density measurements together with NMR data will show that, except for a slight difference in densities, two samples have physical properties which are otherwise so similar that the two samples are deemed to be near-duplicates. The remaining two samples have properties, including bulk densities, which are different from each other, and from the two near-duplicate samples. This indicates that one of the two near-duplicates is two-step CPVC and the other is polymer "A". To determine which one is the two-step CPVC, $T_g$ measurements are made. Since the Cl content is known, and lines for the $T_g$s of several samples of two-step CPVC and polymer "A" have been previously drawn, the identity of the two-step sample is confirmed when its measured $T_g$ falls on the line for the two-step CPVC at the known Cl content.

Figure 7:
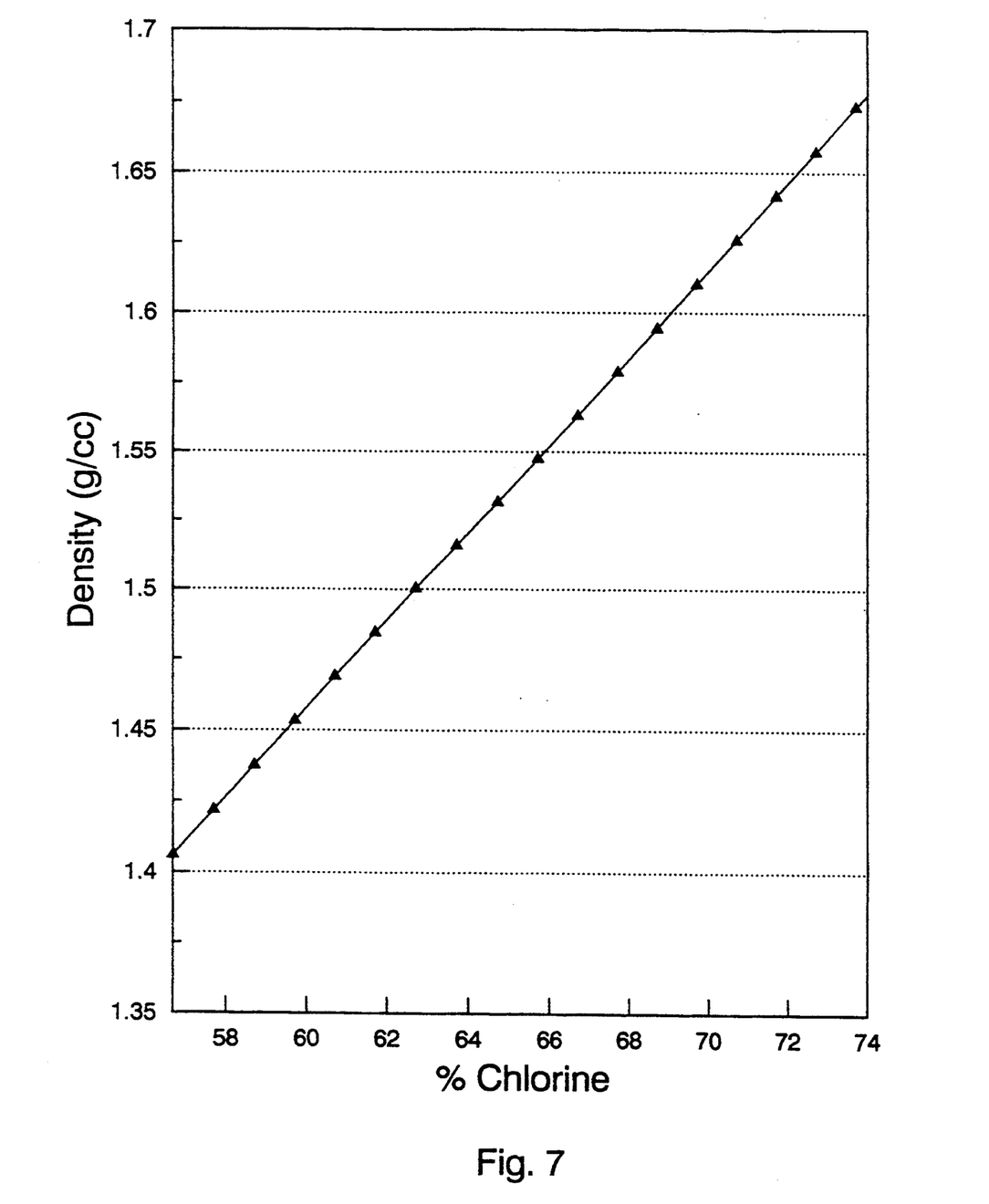
FIG. 7 graphically presents a plot of measured sp gr (g/cc) as a function of Cl content for the fused density of all three CPVCs compared, specifically water-slurry CPVC, solution CPVC, polymer "A" and two-step CPVC.

Referring now to FIG. 7, there is shown a straight line plot for the fused density of water-slurry CPVC as a function of Cl content. The linear relationship shown confirms the well known fact that the relationship of the measured specific gravity of any known CPVC with its total Cl content is linear. This line is used in the art to determine the Cl content by measuring the specific gravity of a CPVC sample. The line is defined by the following equation:

$$\delta = 0.157(\%Cl) + 0.516 \text{ where } \delta = \text{density in gm/cc}$$

Preparation of the Two-Step CPVC—General Preparation

The preferred embodiment of the two-step CPVC is produced by a two-step process described herein (but in greater detail in the parent application) relative to post-chlorinating PVC with an organic peroxy catalyst, most preferably, at least in the first step, a hydroperoxide having a relatively high decomposition temperature. The preferred peroxy catalyst permits control of a highly exothermic reaction so long as the reaction proceeds in two steps, each step carried out under the particular process conditions specified, which conditions allow control of the reaction.

It is well known that the reaction of organic peroxides and the reaction products of such reactions are highly dependent upon the decomposition medium (see Product Bulletin on Lucidol* brand PEROXYESTERS sold by Atochem Chemicals). The medium of this invention is an aqueous slurry of PVC granules to which slurry is added a substantially stoichiometric amount of Cl, without the addition of HCl to the slurry. By "a substantially stoichiometric amount" we refer to an amount which includes a small excess, less than 10 wt % over stoichiometric, of Cl. Typically such excess in the second step is in the range from about 0.5% to 5%, though in some cases, particularly where more than 73% Cl content is desired, there may be more than 5% but less than 10% excess Cl remaining. No liquid chlorine is present during the reaction, except during the time chlorine is introduced as a liquid, if it is so introduced. Such a medium (aqueous PVC slurry with less than 10% Cl excess over that required to make the end product, preferably a substantially stoichiometric amount of Cl) provides an oxidizing environment due to the presence of at least 0.01 mole HOCl/liter of slurry, preferably from 0.05 to 0.1 mole HOCl/liter of slurry. Such an environment is unlike that of a highly acidic slurry, acidified with added HCl and containing a liquid chlorine phase.

It will be appreciated that in the first step, described hereinabove, an intermediate Cl content of from 67–72% by wt is typically reached in 'first step CPVC' which may be recovered as the end product. However, an end product with a higher Cl content will generally be the desired end product of this two-step process. Though the first step CPVC product having 72% Cl or lower, can be readily made and recovered, the detailed description of the invention will not specifically refer to recovery of the first step product.

The detailed description is limited to CPVC end product having a Cl content at least 3% by wt greater than that of the first step CPVC made, typically a CPVC end product with Cl in the range from 70–75% by wt and specifically a product having from 71–73% Cl. A product with as much as 76% by wt Cl may be made, but its processability compares too unfavorably with that of CPVC having a Cl content of 72–75%; further the properties of 75–76% Cl CPVC are not sufficiently better than those of 72–74% Cl CPVC to warrant making the 75–76% Cl product at this time.

The PVC useful in the present invention is the homopolymer of vinyl chloride obtained by either the mass or suspension polymerization techniques, in the form of porous solid macrogranules. The term "macrogranules" is used herein to define a cluster or aggregate of randomly closely packed primary particles of polymer. A handful of macro-granules has the feel of fine sand, and are also referred to as "grains". Macrogranules of PVC which are converted to CPVC will typically have an average diameter in excess of 20μm (micrometers), with a preponderance of particles in excess of 50μm in diam. A preferred size distribution of each macrogranule is in the range from about 50 to about 500μm and conventionally ranges from about 100 to about 200μm. Each macrogranule is made up of a multiplicity of primary particles each in the size range from about 0.05μm to about 5μm, and more typically in the range from about 0.5μm (5,000 μ) to about 2 μm (20,000 μ). The bulk of the primary particles are usually submicron in size, though conditions of polymerization will determine the actual size distribution of both primary particles, and also, macrogranules. Macrogranules can be characterized by their porosity, that is, internal pore volume, and surface area.

The morphology of PVC and CPVC macrogranules, specifically the porosity and surface area, are important properties which determine the physical properties of the polymer after it is molded. Since CPVC is generally derived by the chlorination of PVC, it has been found that the properties of product CPVC may be tailored to a large extent by precisely controlling the conditions under which precursor PVC is polymerized.

Though it is desirable to use highly porous PVC as a starting material to get high chlorination rates, the properties of the CPVC product obtained are generally too poor to meet commercial standards. Therefore, a viable choice of PVC starting material depends in large measure on the characteristics of the process to be used. Since the choice of process must be made with a view to using a particular starting material, it will be evident that this interdependence leaves no obvious choice as to how a "fix" on each selection is to be had.

Most preferred as a starting material is a suspension polymerized PVC having a porosity in the range from about 0.28 to about 0.35 cc/g, a surface area in the range from about 1.0 m2/g to about 3 m2/g, and an inherent viscosity in the range from about 0.95 to about 1.2, that is, having a relatively high molecular weight. The molecular weight of PVC may be related to its inherent viscosity which is determined herein by dissolving 0.24 gram of the resin in 50 ml of cyclohexane while mildly heating and agitating on a solution roller. The solutions are then filtered into an appropriate Ubbelohde viscometer, previously calibrated for the pure solvent. The flow times in seconds for the solutions are determined at four different dilutions to obtain flow data at a number of concentrations. A portion of the original filtered solution is dried to constant weight at 130° C. to obtain a true concentration value. The ratio of the flow time of the solution to the flow time of the pure solvent is a value known as the "relative viscosity." The "inherent viscosity" is defined with respect to relative viscosity as follows:

Inherent viscosity $= \eta_I = (2.303/C)(\log_{10}\eta_{rel}) = \ln(\eta_{rel})/C$ where C is the concentration of PVC (gm)/100 ml of solution.

The PVC resin starting material useful in the process of this invention preferably has a high molecular weight such that it possesses an $\eta_I$ in the range from about 0.5 to about 1.4 the most commonly used PVC resins having $\eta_I$ in the range from about 0.8 to about 1.1, or slightly higher.

To produce chlorinated CPVC commercially, and preferably profitably, it has been found that a relatively concentrated aqueous suspension of PVC must be chlorinated. But the exotherm from such a relatively concentrated suspension is difficult to control, hence the importance of the proper choice of hydroperoxide catalyst. By "relatively concentrated" we refer to a concentration of about 15 to about 35% by wt of PVC solids in the suspension. Since the physical characteristics of such a relatively concentrated suspension of PVC in water are quite different from those having relatively low concentrations, the problems of chlorination in each are quite different, such factors as viscosity of the suspension, clumping of macrogranules, diffusion of gases into and out of the liquid and solid phases present, inter alia, not lending themselves to extrapolation by known methods. It has been found that a concentration of PVC higher than the specified range results in product with an unacceptable concentration of "fish eyes", while concentrations below 15% yield good product, but the process is not economical.

By "aqueous suspension" of PVC we refer to a slurry-like mixture of PVC macrogranules suspended in water. Though, initially the water is not deliberately acidified by the addition of acid, HCl acid is formed when chlorine, whether liquid or gas, is dissolved into the aqueous phase, and during the course of the chlorination. The above-specified concentration of PVC in the suspension is found to yield high output of CPVC for a given reactor volume, without sacrificing the quality of the product, which quality cannot be compromised. This process is particularly directed to a batch process since wholly different considerations enure to the operation of a continuous process.

It is essential for the purpose of obtaining the desired CPVC product, that oxygen be removed from the aqueous suspension, and from within the PVC granules, before chlorination is initiated. This may be effected in any convenient manner. For example, a hot suspension at a temperature in the range from about 50° C. to about 75° C., and containing about 30% PVC may be introduced into a batch reactor and subjected to a vacuum at that temperature so that it boils. Lower temperatures as low as about 20° C. may be employed, but removal of oxygen at such low temperatures is impractical, particularly since the temperature of the suspension is to be raised if it is to be chlorinated by the process of this invention. Removal of oxygen is assisted by agitation of the suspension.

Though any organic peroxy compound which provides free radicals at a temperature lower than about 70° C. may be used in the first step of our process, the decomposition temperature alone of the peroxy compound is not indicative of its effectiveness. For example, though peroxydicarbonates are found to have a catalytic effect in our process, their effectiveness does not compare favorably to that of the organic hydroperoxides and peroxyesters.

There would be no logical reason to expect that a hydroperoxide or dialkyl peroxide might be an effective catalyst, much less one which is more effective than the others. In the universe of peroxy catalysts capable of generating free radicals which might enhance the chlorination of PVC, it cannot be logically deduced which will generate free radicals in a liquid chlorine environment; or, in an environment of aqueous HCl acid in which chlorine is dissolved; or, in an aqueous environment in which chlorine is dissolved. Nor can it be known under what conditions of temperature such radicals will be generated, if they are generated at all; or, if so many will be generated that the resulting exothermic chlorination reaction will defy control.

Depending upon the temperature and the presence of other ingredients of the reaction mass, one skilled in the art would not know to what extent the peroxy catalyst itself might be chlorinated, whether such chlorination would lead to "inert" compounds unreactive with PVC at that temperature, or if radicals will be generated, and what effects they might produce, if any.

Further, since the chlorination of a large mass of PVC at a temperature in the range from ambient (say 20° C.) to 75° C. would result in the release of a very large quantity of heat in a very short time, it will be appreciated that the use of peroxyesters and hydroperoxides for a commercial reactor would logically be shunned.

Preferred peroxyesters, particularly for the first step, are t-amylperoxyneodecanoate (Lupersol*546M75), 3-hydroxy-1,1-dimethylbutylperoxyneodecanoate (Lupersol 610M50), 1,1-dimethyl-3-hydroxybutyl-peroxyneoheptanoate (Lupersol 688M50), t-butylperoxypivalate (Lupersol 11), t-butylperoxyneodecanoate (Lupersol 10), di(2-ethylhexyl)-peroxydicarbonate (Lupersol 223), di(sec-butyl)peroxydicarbonate (Lupersol 225), and acetylcyclohexylsulfonylperoxide (Lupersol 228-Z).

Preferred peroxyesters, particularly for the second step, are t-butylperoxy-2-ethylhexanoate (Lupersol PMS), and t-butylperbenzoate.

Combinations of t-butylperoxypivalate and acetylcyclohexylsulfonylperoxide, or, methylethylketoneperoxide and t-butylperoxy-2-ethylhexanoate, are particularly effective.

Most preferred peroxy catalyst for the first step is a hydroperoxide having a structure selected from the group where R is a hydrocarbyl group having from 4 to 24 carbon atoms;

$R^1$ and $R^2$ represent $C_1$–$C_{20}$ alkyl, or $C_7$–$C_{24}$ aralkyl, most preferably $C_1$–$C_6$ alkyl, and $R^1$ and $R^2$ may be the same or different, and, n represents an integer in the range from 1 to 6, preferably 1, 2, 3 or 4;

and, said hydroperoxide is used in an amount less than 0.5% by weight of the PVC resin, preferably in the range from 0.005% to 0.05%. Typically only enough is used to form first step CPVC having an intermediate Cl level about 3% lower than the % Cl content of the end product CPVC without exceeding the $T_g$ of the CPVC end product resin in the reaction mixture.

Such hydroperoxides would seem to be particularly inapt from the standpoint of their relatively high decomposition temperatures, but their reactivity is surprisingly high. Specifically, methylethyl ketone (MEK) peroxide has a decomposition temperature of about 80° C. (half life of 10 hr). Since the first step, in the best mode, is preferably initiated at a temperature below about 50° C. to enable one to control the exotherm, one would expect the decomposition rate of MEK peroxide at below 50° C. to be too slow to be effective. However, under acidic conditions, and in the absence of free liquid chlorine, it is unexpectedly effective.

A large excess of chlorine is unnecessary to swell the granules of PVC and function as a reactive swelling agent. The effective chlorination of PVC in our process proceeds so that in the second step there is typically only a substantially stoichiometric amount required to produce the end-product; when a CPVC end product having from 72–73% Cl is made, there is typically less than 5%, preferably less than 1% by wt Cl remaining in the reactor after the second step. No swelling agent other than Cl is necessary, and none is present. The amount of chlorine in the PVC granules decreases the $T_g$ of the granules well below the $T_g$ of the PVC alone. Yet, because of the presence of the chlorine, the reaction with PVC proceeds apace, in so short a time that, though the temperature of reaction exceeds the $T_g$ of the PVC granules in suspension, there is essentially no evidence of generation of dense agglomerates, or dense glassy granules ("fish-eyes") which provide evidence of the $T_g$ of the PVC granules having been exceeded over too long a period of time.

We sought to avoid recycling excess chlorine, and to avoid carrying out the reaction under conditions which would require removal of substantially all the heat of reaction. In the most preferred embodiments of the process we have done both.

The result is not only that we have provided a commercial process for making high-Cl-conc CPVC, but we have also provided a two-step CPVC which is fusible at a lower temperature than one would expect for a Cl content of at least 70%.

No HCl is added to the aqueous suspension of PVC in our process. Nor is there present a sufficient excess of chlorine to provide a distinct liquid chlorine phase at any time during the reaction.

Evidence of the effect of a lower Cl concentration near the surface is provided by comparing the fusion temperatures of samples of CPVC having the same overall Cl concentration (say 70%) made by processes the effects of which are being compared. Fusion temperatures are conveniently measured by a simple "button" test. In this test, a sample of polymer is placed in a mold for a disc (referred to as a "button"), and the mold heated to a temperature at which a cohesive button is formed. In general, the lower the temperature at which the button forms, the better the processability of the CPVC. The presence of a continuous phase is evidenced by a clear button, that is, one which is substantially light-permeable.

In a typical process, PVC granules are slurried in deionized water in a jacketed pressurizable reactor fitted with a stirrer and conventionally equipped with a thermocouple in the slurry, safety features such as a vent with relief valve and the like. Molecular oxygen is then removed from the slurry by any conventional means. For example, the slurry is brought up to about 35° C. and sparged with $N_2$. An alternative procedure is to heat the slurry to about 75° C. then subject it to a vacuum, repeating the procedure until the measure concentration in the slurry is less than 50 ppm, preferably less than 5 ppm.

Only a substantially stoichiometric amount of chlorine is introduced, either as a liquid or a gas, sufficient to produce the desired Cl content in the CPVC end product. The chlorine swells the granules. Since the initial Cl content of PVC is typically about. 57%, and it may be raised to up to 75%, the stoichiometric amount of chlorine to be introduced is 135% by weight of the PVC. The stoichiometric amount as follows: 74% by wt $Cl_2$ for 69% Cl CPVC; 82% by wt $Cl_2$ for 70% Cl CPVC; 91% by wt $Cl_2$ for 71% Cl CPVC; 100% by wt $Cl_2$ for 72% Cl CPVC; 110% by wt $Cl_2$ for 73% Cl CPVC; 135% by wt for 75% Cl CPVC.

The peroxy catalyst for both steps may be added right at the outset, or in increments. Typically, all catalyst is added at the outset, and a mixture of catalysts is used, one decomposing at a lower temperature than the other. The importance of the overall reaction being completed relatively quickly becomes evident when one realizes that the effectiveness of the organic peroxy catalysts used is short-lived under the conditions of the reaction.

The pressure at which the reaction is carried out will depend upon the peroxy catalyst used and the temperature at which the reaction is carried out. The higher the temperature, the more quickly will the resin be chlorinated provided the temperature is not so high as to generate "fish eyes". The pressure is preferably in the range from about 25 psig to about 300 psig.

Upon initiation of the chlorination reaction in the first step, the reaction mass gradually increases in temperature which is maintained below 100° C. until the relative pressure of Cl rolls over (begins to decrease), then begins to stabilize, typically when the Cl content of the resin is about 67%–70%, depending upon the Cl content of the CPVC end product to be made. This marks the end of the first step.

In the second step, the chlorination will proceed simply by raising the temperature to about 130° C., particularly if the peroxy catalyst is a two-catalyst mixture, the second catalyst decomposing at the higher temperature of the second step. However, the time for reacting essentially all the chlorine to produce a CPVC of about 72% Cl content (say) may still be too long to be practical. Therefore, the second step is carried out in the presence of oxygen, as stated hereinabove, preferably with the addition of a slight excess of chlorine so that less than a 10% excess over stoichiometric is present in the reactor, the excess, if any, depending upon the Cl content of the end product to be made.

Upon completion of the second step, the reactor is depressurized and the CPVC in the slurry is conventionally recovered. Typically, the slurry is filtered and washed with water, then dried in a convection oven or hot air tower where the wet resin is recirculated with hot air until dry. The CPVC end product formed has a lower concentration of chlorine near its surface, causing said CPVC end product to fuse at the same temperature as another CPVC end product made by a conventional photo-slurry process, wherein the another CPVC contains a lower Cl content. For example, a 72% CPVC end product made by the process of this invention fuses at the same temperature as a 69% CPVC made by the water-slurry process.

EXAMPLE 1

Specific Preparation of Two-Step CPVC having 72% by wt Cl content, by incremental addition of peroxy catalyst in the first step, and in the second step, by addition of 5 ml 3% hydrogen peroxide in 45 ml of DL water to provide oxygen:

A 2 gal reactor is charged with 4 L of demineralized water, 700 gm Geon* PVC 103EPF76-TR which is mixed at room temperature (20° C.) while adding 0.4 gm Delta-X-9 MEK peroxide (from Atochem North America) in 10 ml of a chlorinated paraffin oil DO-10 (from Dover Chemical). The reactor is closed, evacuated to 4 psia, then pressurized with nitrogen to 100 psia and stirred for 30 min. The reactor is then vented and evacuated to 5 psia at 15° C. Then 570 ml of liquid chlorine (6% excess over stoichiometric) are charged at room temperature, and heating the slurry commenced. The temperature increases from 25° C. to 70° C. over a period of 25 min, when the reaction begins to slow, an additional 0.2 gm of the same MEK peroxide is added in 5 ml of DO-10 oil. The reaction begins to slow when the pressure is 172 psia. The pressure continues to decrease as additional chlorine reacts. 5 ml of 5% $H_2O_2$ are added in 45 ml of demineralized water (DM) at 99° C. The temperature of the slurry increases smoothly while the reaction proceeds exothermically and the effect of heating the water jacket is felt. A further acceleration of the reaction occurs, and after about 55 min the reaction is deemed complete. The temperature of the slurry is maintained at about 127° C.

Upon analysis the CPVC is found to have 72.2% by wt Cl. This indicates that 94% of the chlorine charged was reacted. The unreacted chlorine is distributed between the resin, the water and the space above the slurry.

No addition of peroxy catalyst was made after the injection of hydrogen peroxide since the rate of reaction was sufficiently fast; more catalyst could have been added to further accelerate the reaction.

EXAMPLE 2

Specific Preparation of Two-Step CPVC having 70% by wt Cl without providing added molecular oxygen, but adding additional catalyst in the second step:

In a manner analogous to that described in example 1 hereinabove, 800 gm of PVC in 4.6 L of water were slurried with 0.35 gm of Lupersol 10M75 (t-butylperoxyneodecanoate) in 10 gm of mineral oil. After evacuating to 10 psia, gaseous chlorine was charged until the pressure reached 30 psia. The reactor was again evacuated to 10 psia and again gaseous chlorine was added until the pressure was 34 psia. The reactor was again evacuated to 10 psia, and the reaction was started after charging 550 ml of liquid chlorine at room temperature. The reaction proceeds until the temperature reaches 65° C. and the pressure is 207 psia. The slurry is heated when the reaction temperature is 68° C. and 200 psia.

When the temperature reaches 94° C. and 140 psia, the second step is initiated by injecting 0.2 gm of Lupersol t-butylperbenzoate in 10 gm of mineral oil. No additional oxygen is introduced. The temperature increases to 118° C. and the pressure drops to 31 psia indicating the reaction is complete.

Upon analysis the CPVC is found to have 70.1% by wt Cl. At a pressure of 31 psia essentially no free chlorine remains. The time for reaction is about 1 hr.

Example 3

Specific Preparation of polymer "A" as described in example 1 of the '189 patent, but using only 0.8 Kg of PVC:

About 4 Kg of 24% HCl and 800 gm of Geon[R] 103EP-F76TR PVC resin are charged to a 2 gal. glass-lined jacketed reactor with agitation to form a slurry. The reactor was closed, evacuated to 9 psia, then pressurized with chlorine to 26 psia, re-evacuated to 10 psia, then pressurized with chlorine to 26 psia, and re-evacuated to 9 psia to remove most of the molecular oxygen.

910 gm (670 ml) chlorine are charged and the temperature of the resultant mixture increased from about 6° C. to about 8° C. The steps then taken, and the observations made relative to each step, are chronicled herebelow, next to a stated time (in minutes) after the step immediately preceding:

After 7 min:
Add 0.2 gm Lupersol 11 (75% by wt butylperoxypivalate) and 0.1 gm Lupersol 228-Z (29% by wt acetycyclohexylsulfonyl peroxide) diluted with 10 ml of a chlorinated paraffin oil DO-10. Water at about 52° C was then passed through the water jacket of the reactor.

After 8min:
Slurry temperature reached 36.2 ° C, pressure 148 psia chlorine relative pressure [Rel P]=0.91].

After 10 min:
Slurry temperature was 40° C., pressure 148 psia—chlorine relative pressure [Rel P]=0.90].

After 15.5 rain:
Slurry temperature was 45.4° C., pressure 163 psia—chlorine relative pressure [Rel P]=0.86]—indicating the chlorination was proceeding slowly.

After 20 min:
Slurry temperature was 48.5° C., pressure 169 psia—chlorine relative pressure [Rel P]=0.83 ].

After 25 rain:
Slurry temperature was 52.9° C. pressure 178 psia—chlorine relative pressure [Rel P]=0.79]. Slurry temperature begins to rise more quickly and the temperature of water in the jacket was lowered.

After 29 min:
Slurry temperature was 62.2° C., pressure 189 psia—chlorine relative pressure [Rel P]=0.68]—jacket temperature, 40° C.

After 31 rain:
Slurry temperature was 66 4° C. pressure 160 psia—chlorine relative pressure [Rel P]=0.48]—jacket temperature, 11° C. Slurry temperature now begins to drop and the temperature of the water in the jacket is increased to 70° C. Slurry temperature drops to a low of 55° C., then begins to rise.

After 40.5 min:
Slurry temperature was 66.7° C., pressure 117 psia—chlorine relative pressure [Rel P]=0.38]—slurry reached the maximum temperature during the run. Pressure in reactor relieved by opening valve to exhaust vent allowing any remaining chlorine to escape. After reactor reaches ambient pressure (1 atm) the slurry is treated to remove small amounts of dissolved residual chlorine, by sparging with nitrogen gas while keeping the slurry warm with water at 46° C. circulating through the jacket.

Product is discharged as a slurry, filtered, and the wet solids purified by reslurrying in demineralized (DM) water, heating to near boiling, filtering again and vacuum drying for about 24 hr at about 60° C.

Dried CPVC product has a specific gravity of 1,598 indicating 69% Cl by weight. Mass balance calculations indicate that a stoichiometric excess of chlorine equivalent to 39% by wt of resin, was charged. No effort was made to determine whether this excess was present as liquid chlorine.

EXAMPLE 4

In a manner analogous to that described hereinabove in example 3, 1090 gm (800 ml) of chlorine was charged using the same amount of the same PVC resin used before. The maximum slurry temperature reached was 72.1° C. after 26 min. After 60 min, the slurry temperature was 62.6° C. and the pressure 130 psia. The reactor was then vented. The dried CPVC resin recovered had a specific gravity of 1,643 indicating a combined Cl content of 71.8% by wt and calculations indicated that 37% excess over stoichiometric chlorine was used.

EXAMPLE 5

In a manner analogous to that described hereinabove in example 3, 750 gm (550 ml) of chlorine was charged using the same amount of the same PVC resin used before. The maximum slurry temperature reached was 67.4° C. after 34 min. After 36 min, the slurry temperature was 61.7° C. and the pressure 112 psia. The reactor was then vented. The dried CPVC resin recovered had a specific gravity of 1,580 indicating a combined Cl content of 67.8% by wt and calculations indicated that 29% excess over stoichiometric chlorine was used.

EXAMPLE 6

Specific procedure for making "solution CPVC" by a solution post-chlorination and recovering the polymer:

50 gm of the Geon[R] 103EP-F76TR PVC resin are charged to a 2 liter glass reactor, and mixed with 1 liter of tetrachloroethane with agitation, to form a solution having 50 g/L PVC. Gaseous chlorine was fed (0.25 g/min) into the PVC solution under UV radiation (300 W Hg lamp: type H 3C/3A). The various samples represent aliquot portions taken from separate chlorinations which provided CPVC with different Cl contents. The samples were dried overnight in a vacuum oven at 70°-80° C. The dried powders are checked for residual solvent using TGA analysis before running DSC analyses. Solvent loss generally amounted to less than 0.3%.

THE DIFFERENCES DUE TO DISTRIBUTION OF CL IN THE GRANULES

The effect of the differences in distribution of Cl within the granules of CPVC and the resulting physical properties, is evidenced in a comparison of flexural strengths of samples made from the various CPVC samples. The tests were three-point flexural strength tests run with sample strips over a 2 inch span as specified in ASTM D-790-86 in an Instron using a sampling rate of 5 points/sec and a crosshead speed of 0.5 in/min. Each strip is 1 inch wide and 0.125 inch thick cut from a molded sheet, the temperature at which the sheet was molded being noted in the Tables below.

In the following Table 1 the measured yield energy (lb-in) of strips made from CPVC having essentially the same Cl content of about 70%, are set forth side-by-side.

TABLE 1

| Molding Temperature °C. | Strips* from the Two-step process Yield-energy (lb-in) | Strips▲ from the Water-slurry process Yield-energy (lb-in) |
| --- | --- | --- |
| 170 | 10.32 | 0.615 |
| 185 | 8.87 | 0.835 |
| 200 | 10.90 | 4.636 |

*70.3% Cl; ▲70.0% Cl

It is evident that CPVC in the strips from the water-slurry process is not completely fused at 170° C. and 185° C. The yield energies of the strips are about an order of magnitude (10 times) smaller than when fused. Even when the water-slurry CPVC is fused at 200° C. the yield energy is less than one-half that of the sample made with two-step CPVC.

As will be evident from the following Table 2, the order of magnitude difference in yield energies is noted even with strips made from CPVC having more than 72% Cl, though the yield energy decreases as Cl content increases.

TABLE 2

| Molding Temperature °C. | Strips* from the Two-step process Yield-energy (lb-in) | Strips▲ from the Water-slurry process Yield-energy (lb-in) |
| --- | --- | --- |
| 170 | 3.361 | 0.301 |
| 185 | 2.455 | 0.303 |
| 200 | 2.586 | 0.221 |

*72.2% Cl; ▲72.4% Cl

As will be evident, the intragranular Cl distribution of 72.4% Cl water-slurry CPVC has about one-tenth the flexural strength of the strip made with two-step CPVC. It appears that the prior art in a strip does not fuse as completely at 200° C. as does the two-step CPVC, and to the extent the prior art CPVC is fused, it has greatly different flexural strength.

COMPARISON OF PROPERTIES OF INJECTION MOLDED FITTINGS

In the following tests, two-step CPVC and water-slurry CPVC, each having essentially the same Cl content, are compounded with conventional compounding ingredients used to thermoform CPVC having a Cl content of about 70%.

100 parts by wt of each CPVC sample were compounded with the stated parts by wt of the following ingredients:

| | | |
| --- | --- | --- |
| Stabilizer | Di-butyltin bis-thioglycolate | 4.0 |
| Impact modif. | Methacrylated butadiene-styrene p'mer | 8.0 |
| Lubricant | Oxidized Polyethylene | 1.5 |
| Filler | Titanium dioxide (rutile) | 5.0 |

The ingredients were mixed in a Banbury mixer (shell and rotor temperature set at 400° F) until they were smoothly integrated ('fluxed' together). When the temperature of the melt reached approximately 410° F., the melt was dropped and transferred to a two-roll mill and melt-mixed for about 5 min at about 440° F. The hot material was sheeted directly off the mill, and plaques were cut from the sheets. The plaquess were then pressed to a preset thickness at 420° F., then milled to various configurations required for ASTM testing methods. In addition, the majority of the rolled sheet was cubed. The cubes were then injection molded on a 75 ton Van Dorn to produce a variety of ⅜" pipe fittings.

The melt temperature of the injection molded compound was about 445°–470° F.

The properties of samples of the two-step and water-slurry fittings are listed below:

| Test | Compounded Two-Step | Compounded Water-Slurry |
| --- | --- | --- |
| Heat Distortion @ 73° F. (ASTM D-648) | 242 ± 3° F. | 232 ± 3° F. |
| Tensile Strength @ 73° F. (ASTM D-638) | 8,378 ± 141 psi | 7,930 ± 680 psi |
| Tensile Modulus @ 73° F. (ASTM D-638) | 362,000 ± 20.6K | 354,100 ± 5.3K |
| Izod Impact @ 73° F. (ASTM D-256) | 0.93 ± 0.15 ft-lb/in | 1.82 ± 0.57 ft-lb/in |
| 0.75" 90° Quick Burst at 73° F. (ASTM D-1599) | 1131 ± 106 psi | 1266 ± 180 psi |

Having described the novel two-step CPVC in detail and having presented illustrative examples of the best mode for making it, and having compared the two-step resin to the most relevant high-Cl-content CPVCs made by other processes, it will be evident that the high-Cl-content CPVC has provided an easily fusible resin which is processable despite its high Cl content to provide parts which have a higher heat distortion temperature because of their higher $T_g$ at the same Cl level. The problem of providing a CPVC having 70–75% Cl was never before addressed definitively, much less solved. It is therefore understood that no undue restriction is to be imposed by reason of the specific embodiments illustrated and discussed, except as provided by the following claims.

We claim:

1. A mass of microporous macrogranular chlorinated poly(vinyl chloride) ("CPVC") end product derived from an aqueous suspension of granular microporous poly(vinyl chloride) ("PVC") resin having a chlorine content of about 57% Cl, said CPVC being produced by a two-step process, comprising, in a first step,
chlorinating said PVC at a starting temperature in the range from about 30° C. to 75° C., in the absence of liquid chlorine and free oxygen, in the presence of at least a stoichiometric amount of chlorine, but less than a 10% excess over that required to produce said CPVC end product, and a catalytic amount of an organic peroxy catalyst, sufficient to produce first step CPVC having an intermediate Cl level of chemically bound Cl in the range from 67%–72% by weight, said peroxy catalyst having a 10 hr half-life in the range from 30°–130° C.; and, in a second step,
further chlorinating said CPVC formed, in the presence of at least a stoichiometric amount of chlorine, but less than a 10% excess over that required to produce said CPVC end product, at a temperature in the range from 90° C. to 130° C. until the Cl content in said CPVC end product is in the range from 70% to 75% by weight.

2. The CPVC end product of claim 1 wherein said organic peroxy catalyst is selected from the group consisting of dialkyl peroxides and hydroperoxides; peroxy carboxylic acid esters; diorganoperoxycarbonates, diacyl peroxides and mixed anhydrides of organic sulfoperacids and carboxylic acids.

3. The CPVC end product of claim 2 comprising in said first step, chlorinating said PVC with said organic peroxy catalyst in an amount less than about 0.5% by weight of the PVC, and said organic peroxy catalyst has a 10 hr half-life in the range from 50° C. to 120° C.

4. The CPVC end product of claim 3 wherein said first and second steps are carried out in the absence of added hydrochloric acid, and, wherein further chlorinating said first step CPVC results in a gain of at least 3% Cl content within about 30 min at a controllable temperature lower than the $T_g$ of said first step CPVC, substantially independent of volume of said suspension.

5. The CPVC end product of claim 4 wherein said second step is commenced in the presence of from 5-100 ppm of molecular oxygen, optionally generated in situ.

6. The CPVC end product of claim 5 comprising in said first step, chlorinating said PVC in the presence of a first organic peroxy catalyst present in the range from 0.005% to 0.5%, by weight of said PVC; and, in said second step, chlorinating said first step CPVC in the presence of a second organic peroxy catalyst present in the range from 0.005% to 0.5% by weight of said PVC; and, said second peroxy catalyst is the same as said first peroxy catalyst used in said first step, or different.

7. The CPVC end product of claim 6 wherein said first peroxy catalyst has a 10 hr half-life in the range from 50° C. to 120° C.; and, wherein said second peroxy catalyst has a 10 hr half-life in the range from 100° C.-200° C., and, said second peroxy catalyst is different from said first.

8. The CPVC end product of claim 6 wherein said hydroperoxide has a structure selected from the group consisting of

(I)

(II)

(III)

(IV)

and, (V)

where R is a hydrocarbyl group having from 4 to 24 carbon atoms;

$R^1$ and $R^2$ represent $C_1$-$C_{20}$ alkyl, or $C_7$-$C_{24}$ aralkyl, and $R^1$ and $R^2$ may be the same or different.

9. The CPVC end product of claim 6 wherein said second step is commenced by introducing hydrogen peroxide to generate said molecular oxygen.

10. The CPVC end product of claim 8 wherein said second step is commenced by introducing hydrogen peroxide to generate said molecular oxygen, and introducing said second peroxy compound which may be the same as that used in said first step, or different; whereby said PVC is chlorinated to contain about 75% Cl within about 3 hr substantially independent of volume of said suspension, the time being measured from the time in said first step, when said suspension charged with chlorine is warm enough to react sufficiently to decrease the relative pressure in the reactor.

11. The CPVC end product of claim 10 wherein said second peroxy compound has a 10 hr half-life in the range from about 80° C. to 120° C.

12. A novel mass of microporous, chlorinated poly(-vinyl chloride) ("CPVC") resin having a chlorine content in the range from 70% to 73% by weight, said resin being in the form of macrogranules in the size range from about 50μm to 500μm in diameter having an apparent bulk density in the range from 0.574 to 0.595 substantially linearly correlatable with chlorine content in the range from 67.3-71.8% by wt of Cl, an average diameter in excess of 20μm with a preponderance of particles in excess of 50μm in diameter, each macrogranule consisting essentially of a multiplicity of primary particles each in the size range from about 0.05μm to about 5μm, said mass being uniquely identified by a linear correlation of mid-points of measured $T_g$ (° C.) as a function of chlorine content in said range from 70% to 73% by weight Cl, and said correlation is approximated by an equation: $T_g = 8.86 \, (\%Cl) - 467.01$.

13. The novel mass of CPVC resin of claim 12 wherein each CPVC has essentially the same overall Cl content of at least 70% by weight, said macrogranules are in the size range from 100μm to 200μm and each of said primary particles is in the size range from about 0.5μm (5,000 Å) to about 2 μm (20,000 Å) in diameter.

* * * * *